United States Patent
Min et al.

(10) Patent No.: US 12,457,319 B2
(45) Date of Patent: Oct. 28, 2025

(54) DISPLAY APPARATUS FOR PROVIDING 3D IMAGE AND CONTROL METHOD THEREOF

(71) Applicant: SAMSUNG ELECTRONICS CO., LTD., Suwon-si (KR)

(72) Inventors: Kwansik Min, Suwon-si (KR); Sanghyun Sohn, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 298 days.

(21) Appl. No.: 18/140,291

(22) Filed: Apr. 27, 2023

(65) Prior Publication Data

US 2024/0015277 A1 Jan. 11, 2024

Related U.S. Application Data

(63) Continuation of application No. PCT/KR2023/003963, filed on Mar. 24, 2023.

(30) Foreign Application Priority Data

Jul. 5, 2022 (KR) .......................... 10-2022-0082658

(51) Int. Cl.
*H04N 13/398* (2018.01)
*G02B 30/27* (2020.01)
(Continued)

(52) U.S. Cl.
CPC ........... *H04N 13/398* (2018.05); *G02B 30/27* (2020.01); *G02B 30/30* (2020.01); *G06T 5/50* (2013.01);
(Continued)

(58) Field of Classification Search
CPC .. H04N 13/398; H04N 13/125; H04N 13/302; H04N 13/133; H04N 13/189;
(Continued)

(56) References Cited

U.S. PATENT DOCUMENTS

| 4,853,769 A | * | 8/1989 | Kollin | .................. | H04N 13/211 348/42 |
| 8,384,769 B1 | * | 2/2013 | Hong | .................. | H04N 13/156 345/626 |

(Continued)

FOREIGN PATENT DOCUMENTS

| JP | 2006-023599 A | 1/2006 |
| JP | 2019-87864 A | 6/2019 |

(Continued)

OTHER PUBLICATIONS

Chen et al—Investigation of Autostereoscopic Displays Based on Various Display Technologies—202201—MDPI (Year: 2022).*

(Continued)

*Primary Examiner* — YuJang Tswei
(74) *Attorney, Agent, or Firm* — Sughrue Mion, PLLC

(57) ABSTRACT

A display apparatus includes a three dimensional (3D) display including a display panel, and a visual field separator provided on a front surface of the display panel, an enhance display provided at a first angle with respect to the 3D display, a mirror panel provided at a second angle with respect to the 3D display and provided between the 3D display and the enhance display, and at least one processor configured to operate in a 3D image provision mode and operate a two dimensional (2D) image provision mode. The at least one processor is configured to, in the 3D image provision mode, display an input image on the enhance display, provide a virtual image at a position in front of the front surface of the 3D display, and display a multiview image corresponding to the input image on the 3D display. The at least one processor is configured to, in the 2D image provision mode, display the input image on the enhance display, provide the virtual image at a position in front of the front surface of the 3D display, and turn off the 3D display.

18 Claims, 16 Drawing Sheets

(51) Int. Cl.
| | |
|---|---|
| *G02B 30/30* | (2020.01) |
| *G06T 5/50* | (2006.01) |
| *G06T 7/00* | (2017.01) |
| *H04N 13/125* | (2018.01) |
| *H04N 13/133* | (2018.01) |
| *H04N 13/189* | (2018.01) |
| *H04N 13/302* | (2018.01) |
| *H04N 13/305* | (2018.01) |
| *H04N 13/346* | (2018.01) |
| *H04N 13/356* | (2018.01) |
| *H04N 13/359* | (2018.01) |

(52) U.S. Cl.
CPC ......... *G06T 7/0002* (2013.01); *H04N 13/125* (2018.05); *H04N 13/302* (2018.05); *G06T 2207/10012* (2013.01); *G06T 2207/20192* (2013.01); *G06T 2207/30168* (2013.01); *H04N 13/133* (2018.05); *H04N 13/189* (2018.05); *H04N 13/305* (2018.05); *H04N 13/346* (2018.05); *H04N 13/356* (2018.05); *H04N 13/359* (2018.05)

(58) Field of Classification Search
CPC .. H04N 13/305; H04N 13/346; H04N 13/356; H04N 13/359; G02B 30/27; G02B 30/30; G06T 5/50; G06T 7/0002; G06T 2207/10012; G06T 2207/20192; G06T 2207/30168
See application file for complete search history.

(56) References Cited

U.S. PATENT DOCUMENTS

| | | | |
|---|---|---|---|
| 8,487,917 | B2 | 7/2013 | Han et al. |
| 8,860,703 | B2 | 10/2014 | Han et al. |
| 9,588,352 | B2 | 3/2017 | Cho et al. |
| 9,709,814 | B2 | 7/2017 | Nagahara |
| 10,554,962 | B2 | 2/2020 | Perdices-Gonzalez et al. |
| 10,778,365 | B2 | 9/2020 | Kimura et al. |
| 10,778,965 | B2 | 9/2020 | Chung et al. |
| 10,931,939 | B2 | 2/2021 | Park et al. |
| 2006/0238545 | A1* | 10/2006 | Bakin ................... G09G 3/003 345/613 |
| 2007/0242068 | A1 | 10/2007 | Han et al. |
| 2008/0291269 | A1 | 11/2008 | Hong et al. |
| 2013/0063496 | A1* | 3/2013 | Basler .................. G09G 3/3413 345/102 |
| 2013/0286000 | A1 | 10/2013 | Han et al. |
| 2014/0118422 | A1* | 5/2014 | Shang ................. H04N 13/359 345/87 |
| 2016/0219260 | A1* | 7/2016 | Sato ..................... H04N 13/305 |
| 2016/0323566 | A1* | 11/2016 | Vdovin ................. G02B 30/29 |
| 2017/0134720 | A1 | 5/2017 | Park et al. |
| 2018/0063520 | A1 | 3/2018 | Chung et al. |
| 2022/0197023 | A1* | 6/2022 | Mihali ................. G06F 1/1626 |

FOREIGN PATENT DOCUMENTS

| | | | |
|---|---|---|---|
| JP | 2022-084180 | A | 6/2022 |
| KR | 10-2007-0102932 | A | 10/2007 |
| KR | 10-2008-0103407 | A | 11/2008 |
| KR | 10-0947366 | B1 | 4/2010 |
| KR | 10-2017-0006366 | A | 1/2017 |
| KR | 10-2017-0053270 | A | 5/2017 |
| KR | 10-2017-0104899 | A | 9/2017 |
| KR | 10-2018-0025107 | A | 3/2018 |
| KR | 10-2018-0071487 | A | 6/2018 |
| KR | 10-1932972 | B1 | 12/2018 |
| KR | 10-2020-0061488 | A | 6/2020 |

OTHER PUBLICATIONS

Geng—Three-dimensional display technologies—2013—IEEE (Year: 2013).*
Khaire et al—Reduced Dual-Mode Mobile 3D Display Using Crosstalk—2015—ijtrd (Year: 2015).*
Samsung Display Launches New Transparent & Mirror OLED Displays—Strata-gee.com, 2015 (Year: 2015).*
Son et al—Three-dimensional_imaging_methods_based_on_multiview_images—2005—IEEE (Year: 2005).*
International Search Report (PCT/ISA/210) issued Jul. 11, 2023 by the International Searching Authority in International Patent Application No. PCT/KR2023/003963.
Written Opinion (PCT/ISA/237) issued Jul. 11, 2023 by the International Searching Authority in International Patent Application No. PCT/KR2023/003963.
European Communication issued Feb. 13, 2025 by the European Patent Office in European Patent Application No. 23835643.0.

* cited by examiner

DISPLAY APPARATUS FOR PROVIDING 3D IMAGE AND CONTROL METHOD THEREOF

CROSS-REFERENCE TO RELATED APPLICATIONS

This application is a bypass continuation of International Application No. PCT/KR2023/003963, filed on Mar. 24, 2023, which is based on and claims priority to Korean Patent Application No. 10-2022-0082658, filed on Jul. 5, 2022, the disclosures of which are incorporated by reference herein in their entireties.

BACKGROUND

1. Field

The disclosure relates to a display apparatus and a control method thereof, and more particularly, to a display apparatus that can convert between a three-dimensional (3D) image provision mode and a two-dimensional (2D) image provision mode, and a control method thereof.

2. Description of Related Art

Spurred by the development of electronic technologies, various types of electronic apparatuses are being developed and distributed. In particular, display apparatuses such as televisions (TVs) which are one of home appliances that are used the most in general homes are developing rapidly in recent few years.

As the performance of display apparatuses upgrade, types of contents displayed in display apparatuses are also increased in variety. In particular, a stereoscopic display system that enables viewing of 3D contents has been developed and is being distributed.

A stereoscopic display apparatus may be implemented not only as a 3D television used in general homes, but may also be implemented as various types of display apparatuses such as various kinds of monitors, mobile phones, personal digital assistants (PDAs), personal computers (PCs), set top PCs, tablet PCs, electronic photo frames, kiosks, etc. Also, 3D display technologies may be utilized in various fields where 3D imaging is necessary, such as science, medicine, design, education, advertising, computer games, etc.

The stereoscopic display system may largely be classified into an auto-stereoscopic system where viewing is possible without glasses, and a stereoscopic system where viewing should be performed while wearing glasses.

The stereoscopic system may provide a satisfactory stereoscopic sense, but there is inconvenience that a viewer should necessarily use glasses. Compared to this, the auto-stereoscopic system has an advantage that a 3D image can be viewed without glasses, and thus there are continuous discussions for development of the auto-stereoscopic system.

SUMMARY

Provided are a display apparatus that may convert between a 3D image provision mode and a 2D image provision mode, and a control method thereof.

Additional aspects will be set forth in part in the description which follows and, in part, will be apparent from the description, or may be learned by practice of the presented embodiments.

According to an aspect of the disclosure, a display apparatus may include a 3D display including a display panel, and a visual field separator provided on a front surface of the display panel, an enhance display provided at a first angle with respect to the 3D display, a mirror panel provided at a second angle with respect to the 3D display and provided between the 3D display and the enhance display, and at least one processor configured to operate in a 3D image provision mode and operate a 2D image provision mode, wherein the at least one processor is further configured to, in the 3D image provision mode: display an input image on the enhance display, provide a virtual image at a position in front of the front surface of the 3D display, and display a multiview image corresponding to the input image on the 3D display, and wherein the at least one processor is further configured to, in the 2D image provision mode: display the input image on the enhance display, provide the virtual image at a position in front of the front surface of the 3D display, and turn off the 3D display.

The 3D display may be arranged vertically with respect to the enhance display, and the mirror panel may include a half mirror panel tilted 45 degrees with respect to the enhance display.

The position at which the virtual image is provided may be adjusted based on at least one of a location of the 3D display and a location of the enhance display.

The at least one processor may be further configured to, in the 3D image provision mode, render a plurality of image views having different viewpoints based on a depth of the input image and display the multiview image by arranging the plurality of image views in a predetermined arrangement pattern on the display panel of the 3D display.

The at least one processor may be further configured to, in the 3D image provision mode, identify a plurality of first pixels having different viewpoints in the multiview image, identify a plurality of second pixels corresponding to the plurality of first pixels in the virtual image, acquire a first processed image by processing the input image such that at least one of pixel values or brightness values of the plurality of second pixels have different values, and display the first processed image on the enhance display.

The at least one processor may be further configured to, in the 3D image provision mode, predict a cross-talk (X-talk) generated among image views of different viewpoints based on arrangement locations of the plurality of image views, acquire a second processed image that compensates the X-talk by processing the input image based on the predicted X-talk and display the second processed image on the enhance display.

The at least one processor may be further configured to predict user recognized image quality information for the virtual image based on transmittance information of the mirror panel, acquire a third processed image by processing an image quality of the input image based on the user recognized image quality information and target image quality information, and display the third processed image on the enhance display.

The at least one processor may be further configured to acquire a fourth processed image by performing reinforcement processing of at least one of a boundary area, an edge area, and a point area included in the input image in the 3D image provision mode, and display the fourth processed image on the enhance display.

The at least one processor may be further configured to, predict brightness information of the virtual image based on brightness information of the input image and transmittance information of the mirror panel and adjust a brightness of the multiview image based on the predicted brightness information of the virtual image.

A resolution of the image displayed on the enhance display may be equal to or lower than a resolution of the display panel of the 3D display.

According to an aspect of the disclosure, a control method of a display apparatus, the display apparatus including a 3D display including a display panel and a visual field separator provided on a front surface of the display panel, an enhance display provided at a first angle with respect to the 3D display, and a mirror panel provided at a second angle with respect to the 3D display and provided between the 3D display and the enhance display, may include, in a 3D image provision mode, displaying an input image on the enhance display, providing a virtual image at a position in front of the front surface of the 3D display, and displaying a multiview image corresponding to the input image on the 3D display, and, in a 2D image provision mode, displaying the input image on the enhance display, providing the virtual image at a position in front of the front surface of the 3D display and turning off the 3D display.

The 3D display may be arranged vertically with respect to the enhance display, and the mirror panel may include a half mirror panel tilted 45 degrees with respect to the enhance display.

The position at which the virtual image is provided may be adjusted based on at least one of a location of the 3D display and a location of the enhance display.

In the 3D image provision mode, the displaying the multiview image may include rendering a plurality of image views having different viewpoints based on a depth of the input image and displaying the multiview image by arranging the plurality of image views in a predetermined arrangement pattern on the display panel of the 3D display.

In the 3D image provision mode, the displaying the multiview image may include identifying a plurality of first pixels having different viewpoints in the multiview image, identifying a plurality of second pixels corresponding to the plurality of first pixels in the virtual image, acquiring a first processed image by processing the input image such that at least one of pixel values or brightness values of the plurality of second pixels have different values, and displaying the first processed image on the enhance display.

The method may include, in the 3D image provision mode, predicting an X-talk generated among image views of different viewpoints based on arrangement locations of the plurality of image views, acquiring a second processed image that compensates the X-talk by processing the input image based on the predicted X-talk, and displaying the second processed image on the enhance display.

The method may include predicting user recognized image quality information for the virtual image based on transmittance information of the mirror panel, acquiring a third processed image by processing an image quality of the input image based on the user recognized image quality information and target image quality information, and displaying the third processed image on the enhance display.

The method may include acquiring a fourth processed image by performing reinforcement processing of at least one of a boundary area, an edge area, and a point area included in the input image and displaying the fourth processed image on the enhance display.

The method may include predicting brightness information of the virtual image based on brightness information of the input image and transmittance information of the mirror panel and adjusting a brightness of the multiview image based on the predicted brightness information of the virtual image.

According to an aspect of the disclosure, a non-transitory computer-readable storage medium may store instructions that, when executed by at least one processor, cause the at least one processor to, in a 3D image provision mode, display an input image on an enhance display, the enhance display provided at a first angle with respect to a 3D display, provide a virtual image at a position in front of a front surface of the 3D display, and display a multiview image corresponding to the input image on the 3D display, and, in a 2D image provision mode, display the input image on the enhance display, provide the virtual image at a position in front of the front surface of the 3D display, and turn off the 3D display.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
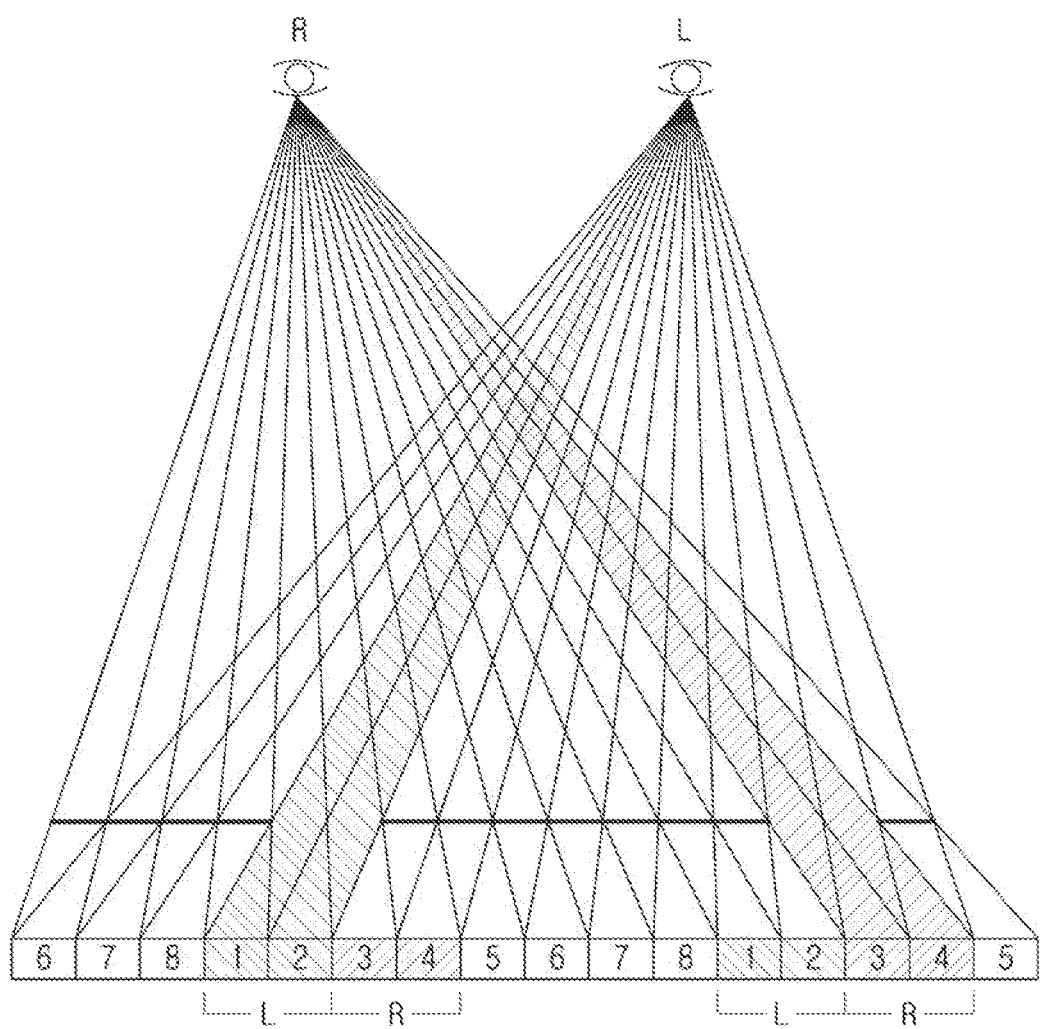
FIG. 1 is a diagram illustrating an operation of an autostereoscopic three dimensional (3D) display apparatus according to an embodiment.

Hereinafter, example embodiments of the disclosure will be described in detail with reference to the accompanying drawings. The same reference numerals are used for the same components in the drawings, and redundant descriptions thereof will be omitted. The embodiments described herein are example embodiments, and thus, the disclosure is not limited thereto and may be realized in various other forms. It is to be understood that singular forms include plural referents unless the context clearly dictates otherwise. The terms including technical or scientific terms used in the disclosure may have the same meanings as generally understood by those skilled in the art.

As terms used in the disclosure, general terms that are currently used widely were selected as far as possible, in consideration of the functions described in the disclosure. However, the terms may vary depending on the intention of those skilled in the art, previous court decisions, or emergence of new technologies, etc. Also, in particular cases, there may be terms that were arbitrarily designated by the applicant, and in such cases, the meaning of the terms will be described in detail in the relevant descriptions in the disclosure. Accordingly, the terms used in the disclosure should be defined based on the meaning of the terms and the overall content of the disclosure, but not just based on the names of the terms.

Also, terms such as "first," "second," etc. may be used to describe various elements, but the terms are not intended to limit the elements. Such terms are used only to distinguish one element from another element.

In addition, singular expressions include plural expressions, unless defined obviously differently in the context. Further, in the disclosure, terms such as "include" and "consist of" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

Also, the expression "at least one of A or B" should be interpreted to mean only "A," only "B," or both of "A" and "B."

In addition, in the disclosure, "a module" or "a part" performs at least one function or operation, and may be implemented as hardware or software, or as a combination of hardware and software. Further, a plurality of "modules" or "parts" may be integrated into at least one module and implemented as at least one processor, except "modules" or "parts" which need to be implemented as specific hardware.

Hereinafter, the embodiments of the disclosure will be described in detail with reference to the accompanying drawings, such that those having ordinary skill in the art to which the disclosure belongs can easily carry out the disclosure. However, it should be noted that the disclosure may be implemented in various different forms, and is not limited to the embodiments described herein. Also, in the drawings, parts that are not related to explanation were omitted, for explaining the disclosure clearly, and throughout the specification, similar components were designated by similar reference numerals.

FIG. 1 is a diagram illustrating an operation of an auto-stereoscopic three dimensional (3D) display apparatus according to an embodiment.

FIG. 1 illustrates an operation method of an apparatus providing a stereoscopic image in an auto-stereoscopic method by displaying a multiview image according to an embodiment, and the multiview image includes a plurality of images that photographed the same object in different angles. That is, an image is provided where a plurality of images photographed in different viewpoints are refracted in different angles, and are focused in locations distanced by a specific distance that may be referred to as a viewing distance. A location where a viewing area is formed may be referred to as an optical view. Accordingly, if a user's one eye is located in a first optical view, and the other eye is located in a second optical view, a stereoscopic sense may be felt.

According to an embodiment, the display apparatus may provide one optical view by using a plurality of image views. Specifically, the display apparatus may generate a plurality of image views through rendering for an input image, and generate a multiview image such that at least two image views among the plurality of image views provide one optical view. As an example, FIG. 1 is a diagram illustrating a display operation in the case of providing four optical views by using eight image views of different viewpoints in total. According to FIG. 1, the auto-stereoscopic 3D display apparatus may emit light corresponding to the first and second viewpoint images to be projected on the left eye, and emit light corresponding to the third and fourth viewpoint images to be projected on the right eye. Accordingly, the user views images of different viewpoints on the left eye and the right eye, and may thus feel a stereoscopic sense. However, this is merely an example, and in the case of providing M (M>>N) optical views by using image views corresponding to N viewpoints in total, one optical view may include image views of N/M viewpoints.

The aforementioned auto-stereoscopic 3D technology has a problem that the resolution is reduced as much as the viewpoints used for increasing the viewing range.

Hereinafter, various embodiments where the resolution of an auto-stereoscopic 3D image may be increased using a virtual image will be described.

Figure 2:
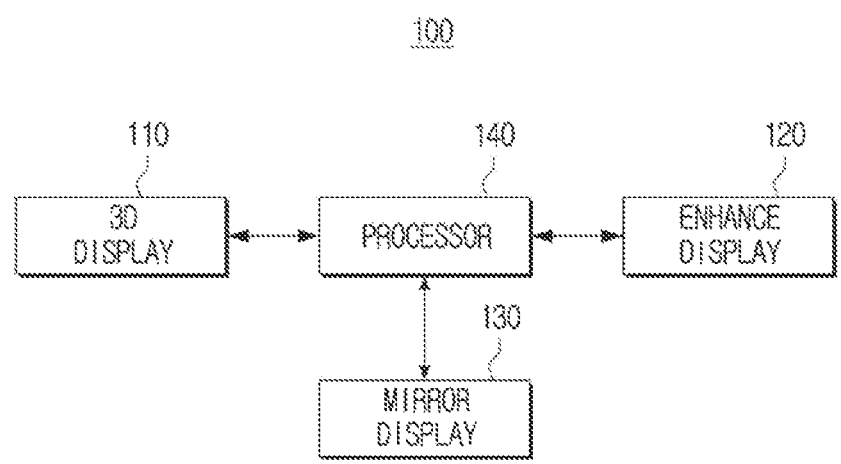
FIG. 2 is a block diagram illustrating a configuration of a display apparatus according to an embodiment.

FIG. 2 is a block diagram illustrating a configuration of a display apparatus according to an embodiment.

According to FIG. 2, the display apparatus 100 includes a 3D display 110, an enhance display 120, a mirror panel 130, and a processor 140.

According to an embodiment, as the display apparatus 100, any apparatus may be applied without limitation if it is an apparatus equipped with a display function such as a television (TV), a monitor, a personal computer (PC), a kiosk, a large format display (LFD), digital signage, a digital information display (DID), a video wall, an electronic display apparatus (or a display for a vehicle), etc.

The 3D display 110 performs a function of providing a plurality of optical views in a viewing area of a user. According to an embodiment, the 3D display 110 includes a display panel 111 for providing a plurality of optical views, and a visual field separator 112 (e.g., a lenticular lens array), as illustrated in FIG. 3.

The display panel 111 includes a plurality of pixels including a plurality of sub-pixels. The sub-pixels may include red (R), green (G), and blue (B). That is, pixels including R, G, and B sub-pixels may be arranged in the directions of a plurality of rows and columns, and constitute the display panel 111. The display panel 111 may be implemented as a display including self-emission elements or a display including non-self-emission elements and a backlight. For example, the display panel 111 may be implemented as displays in various forms such as a liquid crystal display (LCD), an organic light emitting diodes (OLED) display, light emitting diodes (LED), a plasma display panel (PDP), quantum dot light-emitting diodes (QLED), etc. Inside the display panel 111, driving circuits that may be implemented in forms such as an a-si thin film transistor (TFT), a low temperature poly silicon (LTPS) TFT, an organic TFT (OTFT), etc., and a backlight unit and the like may also be included together. The display panel 111 may be implemented as a touch screen combined with a touch sensor, a flexible display, a rollable display, a 3D display, a display to which a plurality of display modules are physically connected, etc.

The visual field separator 112 may be arranged on the front surface of the display panel 111, and provide a different viewpoint (i.e., an optical view for each viewing area). In this case, the visual field separator 112 may be implemented as a lenticular lens, or a parallax barrier.

Figure 3:
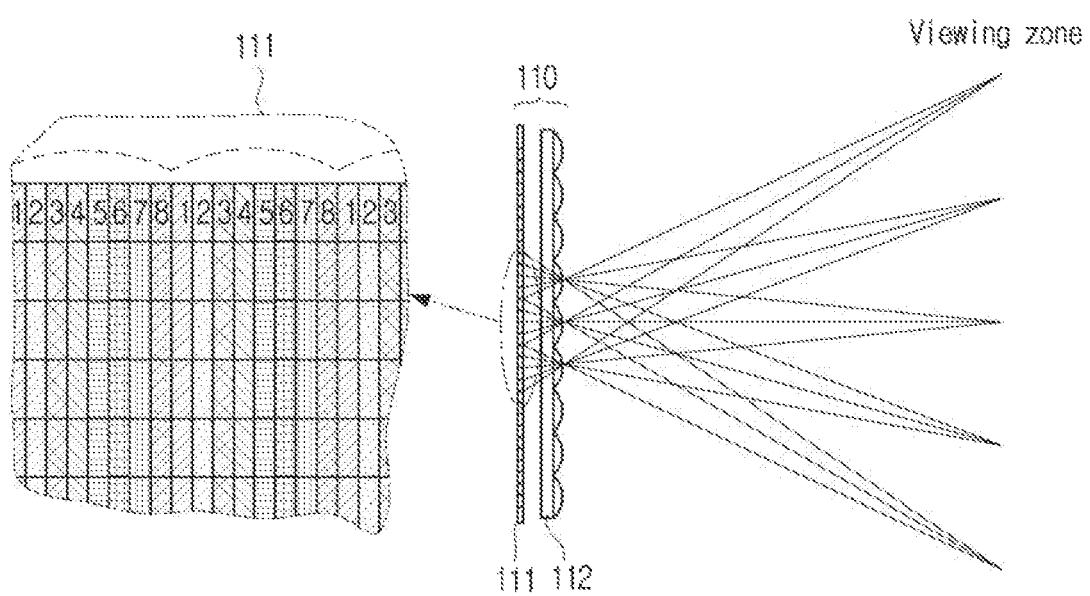
FIG. 3 is a diagram illustrating a configuration of a 3D display according to an embodiment.

FIG. 3 is a diagram illustrating a configuration of a 3D display according to an embodiment. For example, as illustrated in FIG. 3, the visual field separator 112 may be implemented as a lenticular lens including a plurality of lens areas. Accordingly, the lenticular lens may refract an image displayed on the display panel 111 through the plurality of lens areas. Each lens area may be formed in a size corresponding to at least one pixel, and disperse light that passes through each pixel differently for each viewing area. As another example, the visual field separator 112 may be implemented as a parallax barrier. The parallax barrier is implemented as a transparent slit array including a plurality of barrier areas. Accordingly, light may be blocked through slits among the barrier areas, and an image of a different viewpoint may be made to be output for each viewing area.

According to FIG. 3, the display panel 111 includes a plurality of pixels divided into a plurality of columns. For each column, an image view of a different viewpoint is arranged. According to FIG. 3, a form where first to eight views which are a plurality of image views of different viewpoints are sequentially arranged in a repeated manner is shown. That is, each pixel column is arranged in groups numbered as 1, 2, 3, 4, 5, 6, 7, and 8.

Each image view formed on the display panel 111 is projected to the visual field separator 112 (e.g., a lenticular lens array), and the visual field separator 112 disperses the light of each image view projected and transmits the light to the user's direction. That is, the visual field separator 112 generates exit pupils in the user's location (i.e., the viewing distance). The thickness and the diameter of the lenticular lens in the case of being implemented as a lenticular lens array, and the interval of the slits in the case of being implemented as a parallax barrier, may be designed such that the exit pupils generated by each column are separated by an average binocular center distance less than about 65 mm. The separated image lights respectively form optical views. That is, as illustrated in FIG. 3, in case a plurality of optical views are formed in the viewing area, and the left eye and the right eye of the user are respectively located in different optical views, a 3D image may be viewed.

The enhance display 120 may be implemented as a conventional display panel displaying a 2D image. For example, the enhance display 120 may be implemented as a display including self-emission elements or a display including non-self-emission elements and a backlight. For example, the enhance display 120 may be implemented as displays in various forms such as a LCD, an OLED display, LED, a PDP, QLED, etc. Inside the enhance display 120, driving circuits that may be implemented in forms such as an a-si TFT, a LTPS TFT, an OTFT, etc., and a backlight unit and the like may also be included together. The enhance display 120 may be implemented as a touch screen combined with a touch sensor, a flexible display, a rollable display, a 3D display, a display to which a plurality of display modules are physically connected, etc.

Figure 4:
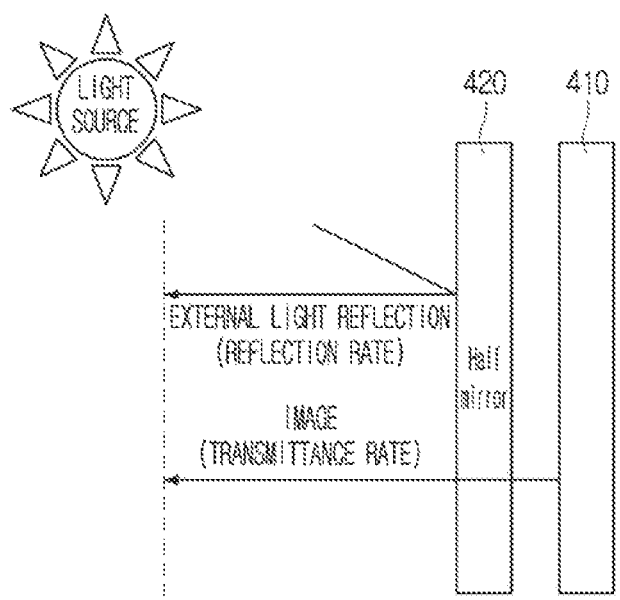
FIG. 4 is a diagram illustrating a usage form of a half mirror according to an embodiment.

FIG. 4 is a diagram illustrating a usage form of a half mirror according to an embodiment. The mirror panel 130 may be implemented in a form of including a half mirror (or a mirror film). The half mirror may be implemented as a glass plate or a transparent plastic plate on which a metal thin film or a dielectric multilayer film is deposited which reflects a portion of the introduced light amount, and makes the other portion pass through. FIG. 4 illustrates a general usage form of the half mirror. A user views an image displayed on the display panel 410 by passing through the half mirror 420, and in case an image is not reproduced simultaneously, the user sees the light which is an external light source reflected by the half mirror 420, and thus the half mirror 420 may be used as a mirror. In the half mirror 420, special coating processing is performed on the glass, and thus the reflection rate and the transmittance rate may be half and half, but the disclosure is not necessarily limited thereto.

Figure 5:
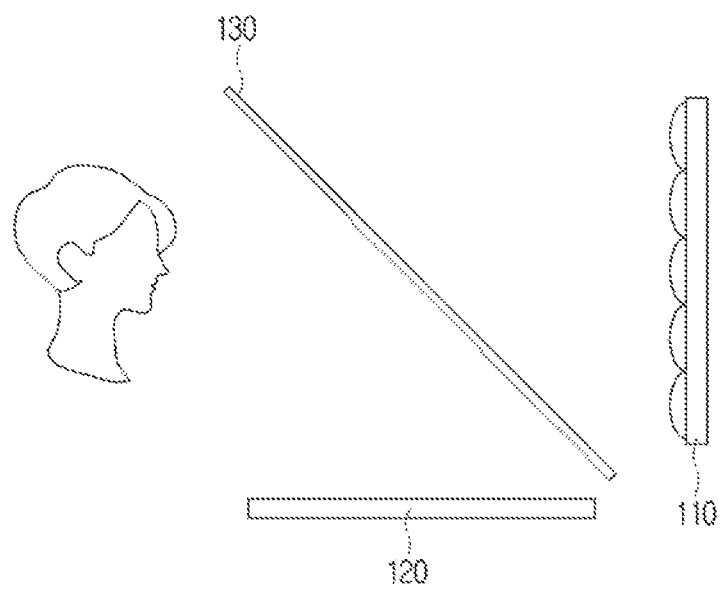
FIG. 5 is a diagram illustrating an arrangement form of a 3D display, an enhance display, and a mirror panel, according to an embodiment.

FIG. 5 is a diagram illustrating an arrangement form of a 3D display, an enhance display, and a mirror panel, according to an embodiment.

According to an embodiment, as illustrated in FIG. 5, the enhance display 120 may be arranged in a first angle with respect to the 3D display 110. Also, the mirror panel 130 may be arranged in a second angle between the 3D display 110 and the enhance display 120.

For example, the 3D display 110 may be arranged vertically with respect to the enhance display 120. However, the disclosure is not necessarily limited thereto, and the first angle may have a different value within a threshold angle range based on 90 degrees.

Also, the mirror panel 130 may be arranged to be tilted in 45 degrees with respect to the enhance display 120. However, the disclosure is not necessarily limited thereto, and the second angle may have a different value within a threshold angle range based on 45 degrees.

At least one processor 140 (also referred to as the processor 140) is electronically connected with the 3D display 110, the enhance display 120, and the mirror panel 130, and controls the overall operations of the display apparatus 100. The at least one processor 140 may include one or a plurality of processors. The at least one processor 140 may be implemented as at least one software or at least one hardware, or a combination of at least one software and at least one hardware. According to an embodiment, software or hardware logic corresponding to the at least one processor 140 may be implemented in one chip. According to an embodiment, the software or hardware logic corresponding to some of the plurality of processors may be implemented in one chip, and the software or hardware logic corresponding to the rest of the processors may be implemented in different chips.

Specifically, the processor 140 may perform the operations of the display apparatus 100 according to the various embodiments of the disclosure by executing at least one instruction stored in a memory.

According to an embodiment, the processor 140 may be implemented as a digital signal processor (DSP) processing digital image signals, a microprocessor, a graphics processing unit (GPU), an artificial intelligence (AI) processor, a neural processing unit (NPU), and a timing controller (TCON). However, the disclosure is not limited thereto, and the processor 140 may include one or more of a central processing unit (CPU), a micro controller unit (MCU), a micro processing unit (MPU), a controller, an application processor (AP), or a communication processor (CP), and an ARM processor, or may be defined by the terms. In addition, the processor 140 may be implemented as a system on chip (SoC) having a processing algorithm stored therein or large scale integration (LSI), or in the form of an application specific integrated circuit (ASIC), or a field programmable gate array (FPGA).

Further, the processor 140 for executing a neural network model according to an embodiment may be implemented as a generic-purpose processor such as a CPU, an AP, a DSP, etc., a graphics-dedicated processor such as a GPU and a vision processing unit (VPU), or a combination of an AI-dedicated processor such as a NPU and software. The processor 140 may perform control to process input data according to predefined operation rules or a neural network model stored in the memory. Alternatively, in case the processor 140 is a dedicated processor (or an AI-dedicated processor), the processor 140 may be designed as a hardware structure specified for processing of a specific neural network model. For example, hardware specified for processing of a specific neural network model may be designed as a hardware chip such as an ASIC, an FPGA, etc. In case the processor 140 is implemented as a dedicated processor, the processor 140 may be implemented to include a memory for implementing the embodiments of the disclosure, or implemented to include a memory processing function for using an external memory.

Figure 6:
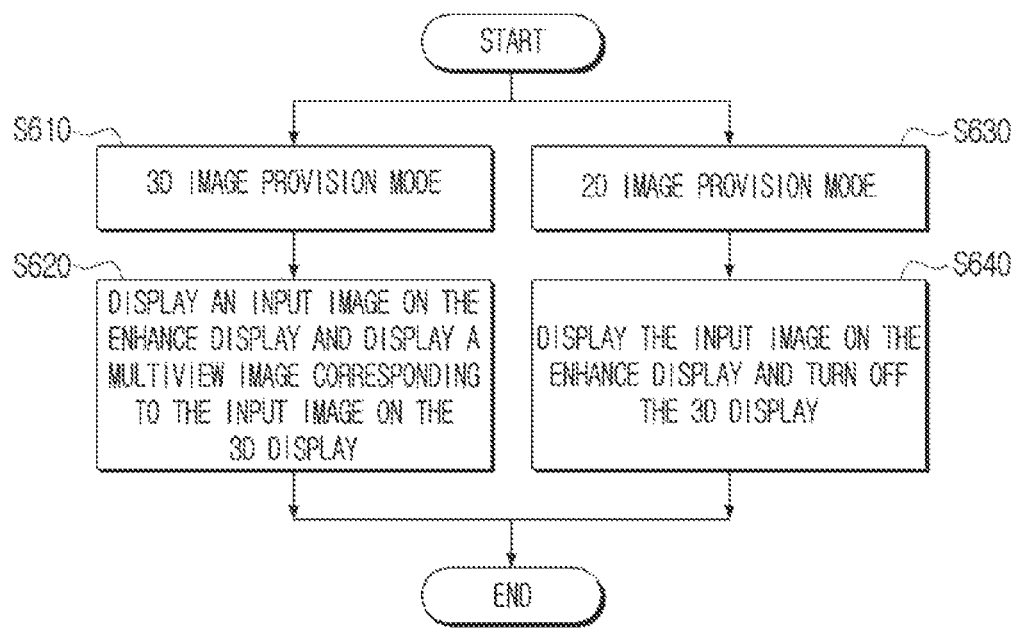
FIG. 6 is a flowchart illustrating an operation of a processor according to an embodiment.

FIG. 6 is a flowchart illustrating an operation of a processor according to an embodiment.

According to an embodiment, the processor 140 may operate in any one of a 3D image provision mode or a 2D image provision mode. For example, the display apparatus 100 may operate in any one of a 3D image provision mode or a 2D image provision mode based on a user instruction, the type of an input image, a predetermined mode, etc.

According to an embodiment, the 3D image provision mode is identified in operation S610. In operation S620 the processor 140 may display an input image on the enhance display 120, and display a multiview image corresponding to the input image on the 3D display 110. The input image may not only be the input image itself, but also be a processed image which processed the input image as an image, and various embodiments related thereto will be described later.

An input image may be received by a streaming or download method from various kinds of external apparatuses such as an external apparatus (e.g., a source apparatus), an external storage medium (e.g., a universal serial bus (USB) memory), an external server (e.g., a webhard), etc. Alternatively, an input image may be an image stored in an internal memory in advance. According to an embodiment, an input image may be any one image among a single view image, a stereoscopic image, or a multiview image. A single view image may refer to an image photographed by a general photographing apparatus. A stereoscopic image may refer to a 3D video image expressed only with a left eye image and a right eye image, and is a stereoscopic image photographed by a stereoscopic photographing apparatus. In general, a stereoscopic photographing apparatus is a photographing apparatus including two lenses, and is used for photographing a stereoscopic image. A multiview image may refer to a 3D video image which geometrically corrects images photographed through at least one photographing apparatus, and provides various viewpoints in several directions to a user through spatial synthesis, etc.

According to an embodiment, an input image may be received together with depth information of an image. In general, the depth of an image is a depth value given to each pixel of the image, and as an example, a depth of 8-bit may have a grayscale value of 0-255. For example, when indicated based on black/white, the black color (a low value) may indicate a place far from the viewer, and the white color (a high value) may indicate a place close to the viewer. The depth information is information indicating the depth of a 3D image, and is information corresponding to the degree of the binocular parallax between the left eye image and the right eye image constituting the 3D image. According to the depth information, the degree of a stereoscopic sense felt by a person varies. That is, in case the depth is big, the binocular parallax between the left eye and the right eye becomes big, and thus a stereoscopic sense is felt relatively bigger, and in case the depth is small, the binocular parallax between the left eye and the right eye becomes small, and thus a stereoscopic sense is felt relatively smaller. The depth information may be acquired, in general, a passive method of acquiring the depth information only with a two-dimensional characteristic of an image such as stereo matching, and an active method of using an equipment such as a depth camera. The depth information may be in the form of a depth map. A depth map may refer to a table including depth information for each area of an image. An area may be divided in pixel units, or may be defined as a predetermined area bigger than pixel units. According to an embodiment, a depth map may be in a form of using 127 or 128 among grayscale values of 0-255 as a reference value (e.g., 0 (or a focal plane)). The depth map may indicate a value smaller than 127 or 128 as a −value, and a value bigger than 127 or 128 as a +value. The reference value of the focal plane may be randomly selected between 0 and 255. A −value may indicate sinking, and a +value may indicate protruding.

The processor 140 may render a plurality of image views of different viewpoints based on an input image and/or the depth information.

In case an input image is a 2D image, the processor 140 may render a plurality of image views of different viewpoints based on depth information extracted for 2D/3D conversion. Alternatively, if a plurality of image views of different viewpoints and a plurality of corresponding depth information are received, the processor 140 may render image views of a number (referred to as N hereinafter) based on at least one image view and depth information among the plurality of image views and depth information. Alternatively, if only a plurality of image views of different viewpoints are received, the processor 140 may extract depth information from the plurality of image views, and then render N image views based on the extracted depth information.

The processor 140 generates a multiview image to be displayed on the 3D display 110 based on sub-pixel values constituting the plurality of rendered image views of different viewpoints. For example, the processor 140 may provide a multiview image by arranging the plurality of image views in a predetermined arrangement pattern on the display panel 111.

Figure 7:
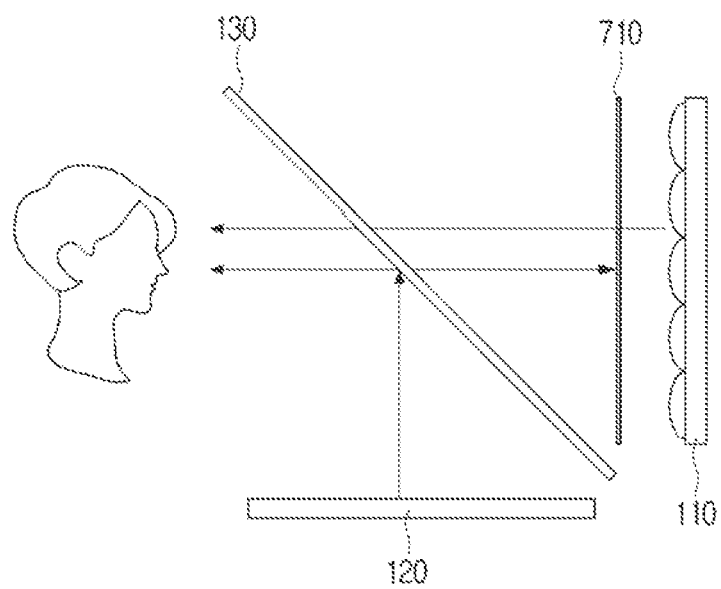
FIG. 7 is a diagram illustrating an operation of a display apparatus in a 3D image provision mode according to an embodiment.

FIG. 7 is a diagram illustrating an operation of a display apparatus in a 3D image provision mode according to an embodiment.

According to FIG. 7, when an image is displayed on the enhance display 120, a virtual image 710 may be provided in a space on the front side of the 3D display 110 by an operation of the mirror panel 130. That is, the virtual image 710 may be provided at a position in front of a front side of the 3D display 110, such that the virtual image 710 may be separated from the front of the 3D display 110 by a predetermined distance. For example, the Pepper's Ghost method may be used, but the disclosure is not limited thereto. The virtual image may refer to an image that is projected on a space and provided, but not a physical panel.

That is, the virtual image 710 that may improve the viewing resolution of a 3D image with a reduced resolution is provided between the 3D display 110 and a viewer, and the viewing resolution, the color purity, the contrast ratio, etc., of the 3D image may thereby be improved. In particular, reduction of the luminance and a moire that may be generated in a structure where a transparent display is arranged on the front side of the 3D display 110 may be prevented. For example, in the case of a structure where a transparent display is arranged on the front side of the 3D display 110, there may be a restriction on the resolution that may be improved due to a tradeoff relation between the transmittance and the resolution. Also, if a moire is generated due to overlapping of regular patterns of the 3D display 110 and the transparent display, and a dispersion function is inserted between the two displays for overcoming this, the stereoscopic characteristic may be degraded, and it may become a factor for reduction of the luminance.

However, as in the embodiment illustrated in FIG. 7, if the virtual image 710 is used as an enhance image, the resolution of the 3D viewing image is improved, and a moire is not generated.

According to an embodiment, the virtual image 710 may be provided in a location distanced by a predetermined distance on the front side of the 3D display 110. In this case, the location where the virtual image 710 is provided (i.e., the interval between the 3D display 110 and the virtual image 710) may be adjusted by changing the location of at least one of the 3D display 110 or the enhance display 120. For example, as the distance between the 3D display 110 and the enhance display 120 increases, the virtual image 710 may be provided in a location of a relatively farther distance from the 3D display 110.

According to an embodiment, the resolution of an image displayed on the enhance display 120 may be identical to or lower than the resolution of the display panel included in the 3D display 110. For example, an image displayed on the 3D display 110 may be any one image among a standard definition (SD) image, a high definition (HD) image, a full HD image, and an ultra HD image. Also, an image displayed on the enhance display 120 may be any one image among an SD image, an HD image, a full HD image, and an ultra HD image. In case reduction of the cost of the enhance display 120 is not considered, the resolution of an image displayed on the enhance display 120 may be higher than the resolution of a multiview image displayed on the 3D display 110, depending on implementation examples.

According to an embodiment, the 2D image provision mode is identified in operation S630. In operation S640 the processor 140 may display an input image on the enhance display 120 and turn off the 3D display 110.

Figure 8:
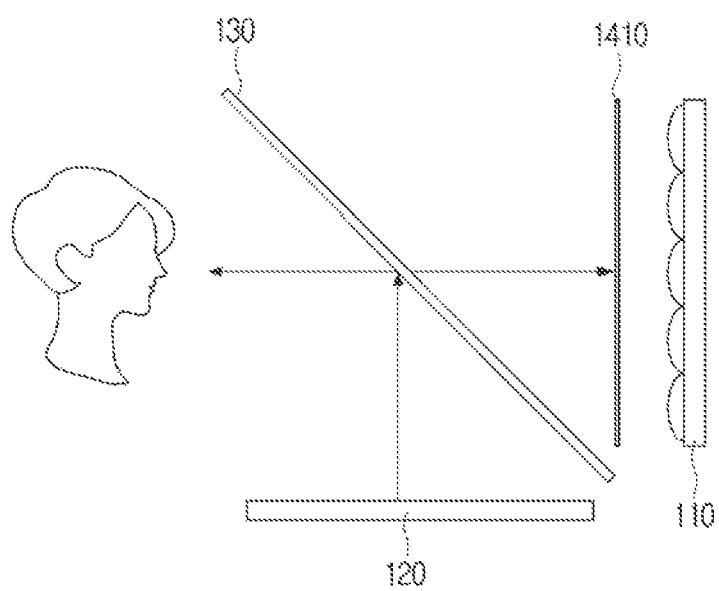
FIG. 8 is a diagram illustrating an operation of a display apparatus in a 2D image provision mode according to an embodiment.

FIG. 8 is a diagram illustrating an operation of a display apparatus in a 2D image provision mode according to an embodiment. For example, as illustrated in FIG. 8, by making the 3D display 110 a black screen (i.e., turning off the 3D display), and implementing a 2D image in a void as the virtual 2D image 1410, the same effect as in viewing a general 2D display may be implemented. That is, the virtual image 1410 may be provided at a position in front of a front side of the 3D display 110, such that the virtual image 1410 may be separated from the front of the 3D display 110 by a predetermined distance.

Figure 9:
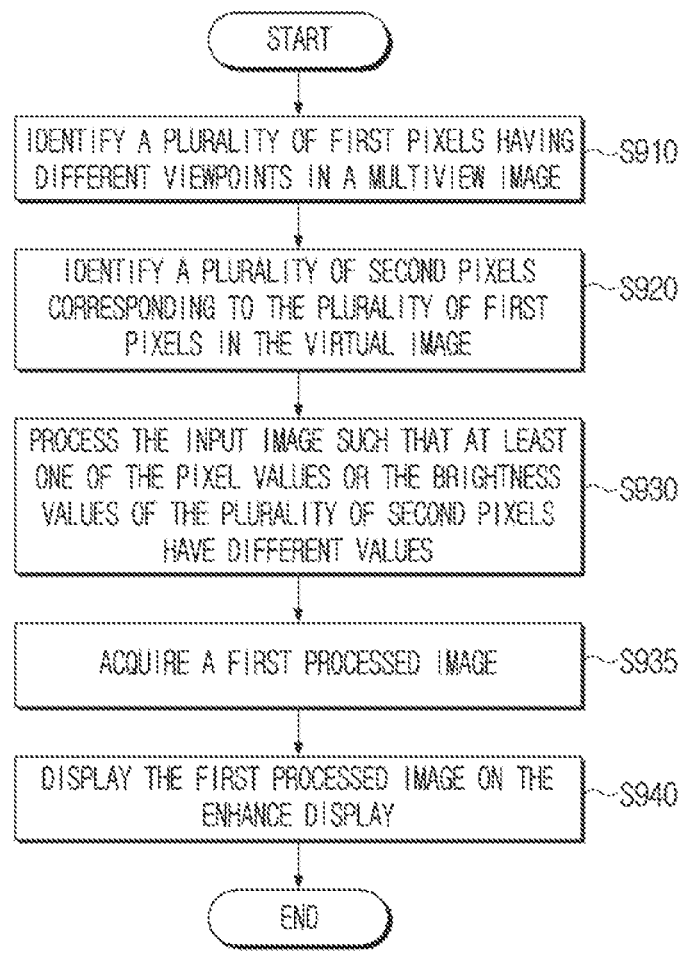
FIG. 9 is a flowchart illustrating a method of processing an enhance image according to an embodiment.

FIG. 9 is a flowchart illustrating a method of processing an enhance image according to an embodiment.

According to FIG. 9, the processor 140 may identify a plurality of first pixels having different viewpoints in a multiview image to be displayed on the 3D display 110 in operation S910. According to an embodiment, as illustrated in FIG. 3, the eight pixels corresponding to the first viewpoint to the eighth viewpoint may be identified as the first pixels. If it is assumed that the eight pixels are provided to a plurality of users respectively corresponding to the first viewpoint to the eighth viewpoint, the eight pixels may be recognized as one pixel to one user.

The processor 140 may identify a plurality of second pixels corresponding to the plurality of first pixels in a virtual image to be provided through the enhance display 120 in operation S920. According to an embodiment, as illustrated in FIG. 3, the second pixels on the virtual image corresponding to the eight pixels of the first viewpoint to the eighth viewpoint may be identified. In this case, while the plurality of first pixels identified in the operation S910 are recognized as one pixel to a user, the plurality of second pixels are respectively recognized as different pixels.

The processor 140 may process the input image such that at least one of the pixel values or the brightness values of the plurality of second pixels have different values in operation S930. The processor 140 may acquire a first processed image in operation S935.

According to an embodiment, as illustrated in FIG. 3, the plurality of first pixels identified in the operation S910 are recognized as one pixel to a user, and thus at least one of the resolution or the brightness value recognized by the user for the image displayed on the 3D display 110 may be reduced. Accordingly, the processor 140 may process the virtual image as an image for improving at least one of the resolution or the brightness value of the 3D image. For example, the processor 140 may process the input image such that the plurality of second pixels included in the virtual image corresponding to the plurality of first pixels included in the 3D image have different pixel values. The processor may also acquire the first processed image. Alternatively, the processor 140 may process the input image such that the plurality of second pixels corresponding to the plurality of first pixels have different brightness values, and acquire the first processed image. Alternatively, the processor 140 may process the input image such that the plurality of second pixels corresponding to the plurality of first pixels have different pixel values and brightness values, and acquire the first processed image.

The processor 140 may display the first processed image on the enhance display 120 in operation S940.

Figure 10:
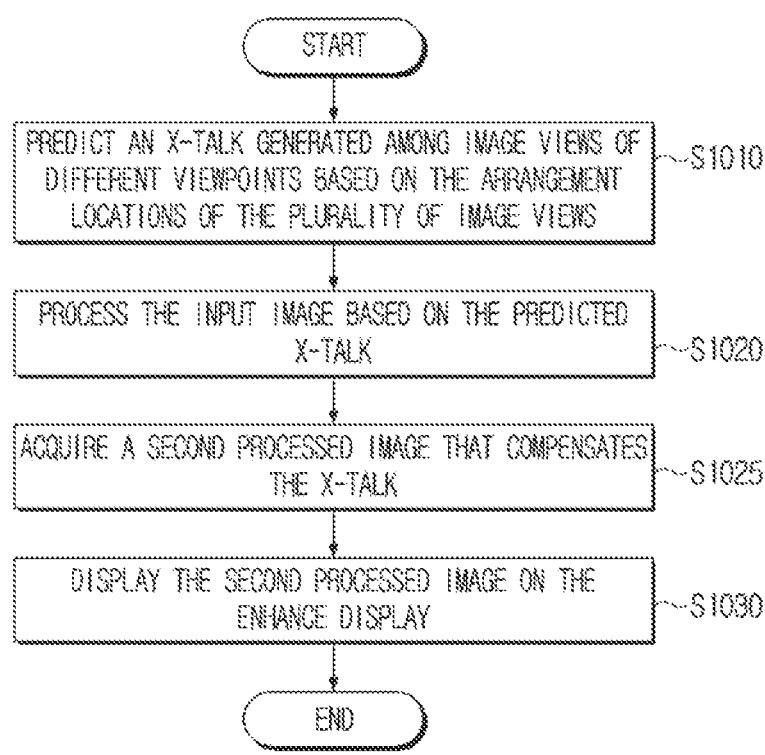
FIG. 10 is a flowchart illustrating a method of processing an enhance image according to an embodiment.

FIG. 10 is a flowchart illustrating a method of processing an enhance image according to an embodiment.

According to FIG. 10, the processor 140 may predict a cross-talk (X-talk) generated among image views of different viewpoints based on the arrangement locations of the plurality of image views in a multiview image in operation S1010. Prediction of the X-talk may be performed by applying the conventional various methods, e.g., an X-talk matrix.

The processor 140 may process the input image based on the predicted X-talk in operation S1020, and acquire a second processed image that compensates the X-talk in operation S1025. According to an embodiment, the processor 140 may process the input image such that reverse compensation for the predicted X-talk is achieved. The processor 140 may acquire a second processed image.

The processor 140 may display the second processed image on the enhance display 120 in operation S1030.

Figure 11:
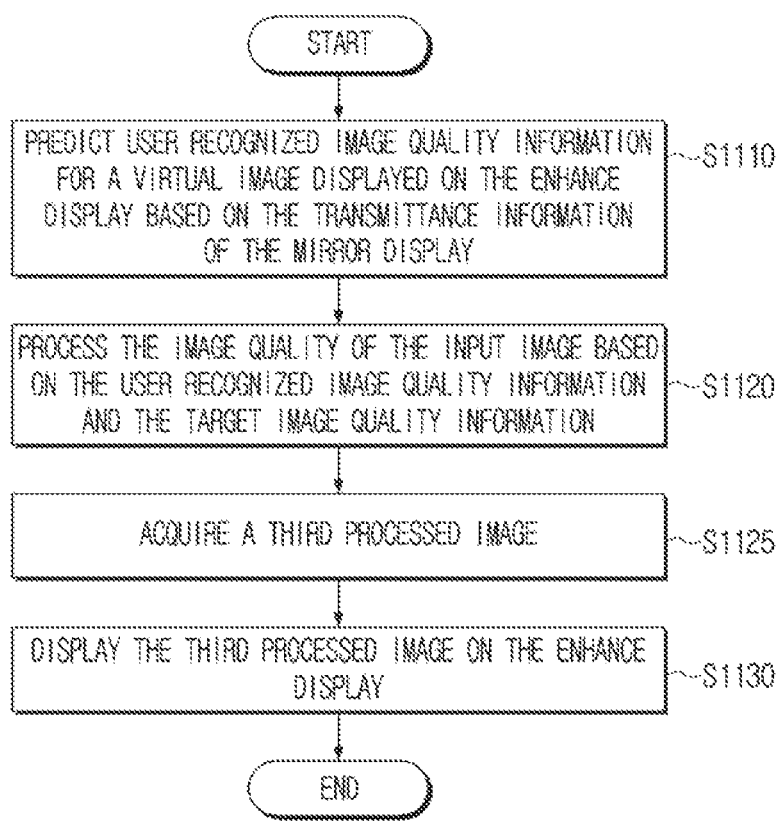
FIG. 11 is a flowchart illustrating a method of processing an enhance image according to an embodiment.

FIG. 11 is a flowchart illustrating a method of processing an enhance image according to an embodiment.

According to FIG. 11, the processor 140 may predict user recognized image quality information for a virtual image provided through the enhance display 120 based on transmittance information of the mirror panel 130 in operation S1110.

The transmittance information of the mirror panel 130 may include information on a luminance value according to the grayscale of the virtual image determined based on the transmittance of the mirror panel 130. For example, the luminance characteristic information of the mirror panel 130 may be a luminance measurement value according to the grayscale of the virtual image. That is, the mirror panel 130 has a fixed transmittance, and thus the luminance value according to the grayscale of the virtual image recognized by the user may be acquired by displaying an image signal for each grayscale on the enhance display 120. That is, by calculating a luminance measurement value according to the grayscale of the virtual image by displaying a 0 IRE (Institute of Radio Engineers) (black)-100 IRE (white) image signal (e.g., in the case of an 8 bit image, an image of a grayscale of 0-255) on the enhance display 120, and the luminance measurement value may be stored in the memory.

Figure 12:
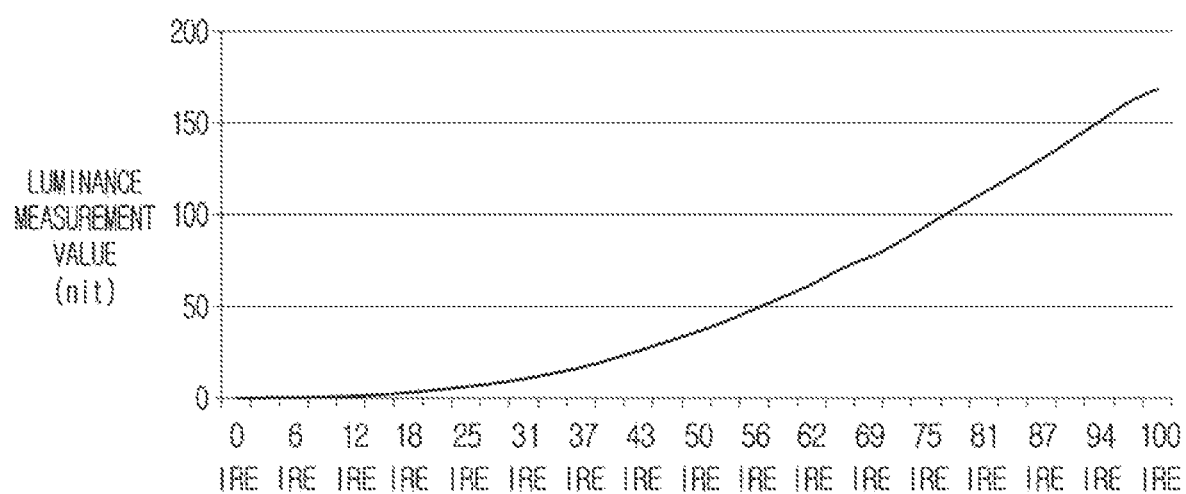
FIG. 12 is a diagram illustrating transmittance information of a mirror panel according to an embodiment.

FIG. 12 is a diagram illustrating transmittance information of a mirror panel according to an embodiment.

As illustrated in FIG. 12, a luminance value for a virtual image may be measured by displaying a 0 IRE (black)-100 IRE (white) image signal on the enhance display 120, and a luminance measurement value for each grayscale in accordance thereto (i.e., transmittance characteristic information may be stored in the memory). Also, as described above, the luminance measurement value for each grayscale may be a value predicted by the processor 140 but not an actually measured value, or it may be received from the outside. However, depending on cases, the memory may store only a basic luminance graph, and the processor 140 may calculate a luminance graph corresponding to the transmittance of the mirror panel 130 in real time according to a look-up table (LUT), a calculation formula, etc.

The processor 140 may process the image quality of the input image based on the user recognized image quality information and the target image quality information for the virtual image in operation S1120, and acquire a third processed image in operation S1125.

According to an embodiment, the processor 140 may identify user recognized luminance information for an image displayed on the 3D display 110 based on the information stored in the memory, process the luminance of the input image based on the target luminance information, and acquire a third processed image.

The processor 140 may display the third processed image on the enhance display 120 in operation S1130.

Figure 13:
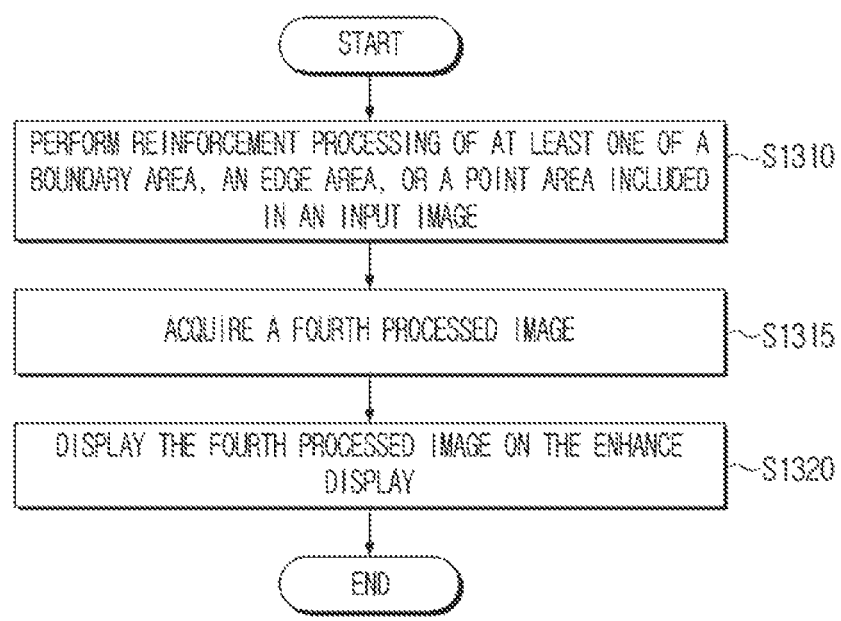
FIG. 13 is a flowchart illustrating a method of processing an enhance image according to an embodiment.

FIG. 13 is a flowchart illustrating a method of processing an enhance image according to an embodiment.

According to FIG. 13, the processor 140 may perform reinforcement processing of at least one of a boundary area, an edge area, or a point area included in the input image, in operation S1310, and acquire a fourth processed image in operation S1315. The boundary area, the edge area, and the point area may be areas that are recognized by the user foremost. The boundary area may be the boundary area or the text area of an object, and the edge area may be an area including a clear straight edge. As an example, the boundary area may be an area having a thickness greater than or equal to a threshold thickness, and the edge area may be an area having a thickness smaller than a specific threshold thickness. The point area is an area where specific pixel values are agglomerated in greater than or equal to a specific range, and may include the point area of an object. For example, the point area may include areas such as a person's eyes, eyebrows, lips, etc.

According to an embodiment, the processor 140 may perform reinforcement processing of at least one of the boundary area, the edge area, or the point area (e.g., adjustment of the pixel values, shadowing processing, etc.), and acquire the fourth processed image.

The processor 140 may display the fourth processed image on the enhance display 120 in operation S1320. For example, in case a virtual image is provided through the fourth processed image where reinforcement processing was performed for at least one of the boundary area, the edge area, or the point area, the area may be recognized more clearly to the user.

Figure 14:
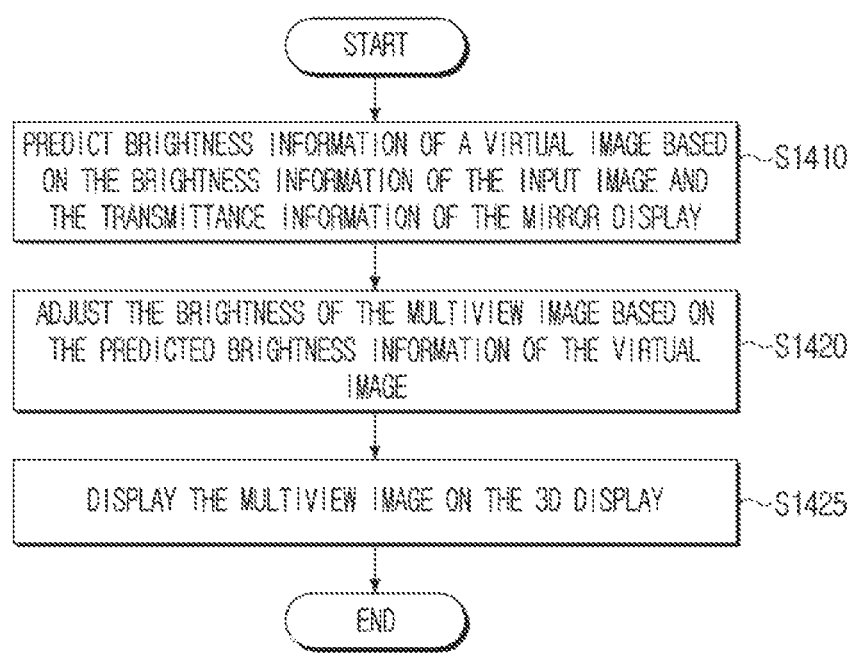
FIG. 14 is a flowchart illustrating a method of processing a multiview image according to an embodiment.

FIG. 14 is a flowchart illustrating a method of processing a multiview image according to an embodiment.

According to FIG. 14, the processor 140 may predict brightness information of a virtual image based on the brightness information of the input image and the transmittance information of the mirror panel 130 in operation S1410.

According to an embodiment, in case the enhance display 120 is implemented as an LCD, the processor 140 may acquire a dimming ratio for driving the backlight unit (i.e., the lighting duty of a current (referred to as a current duty hereinafter)) based on the pixel information (or the physical amount of pixels) of the input image. The pixel information may be at least one of the average pixel value, the maximum pixel value (or the peak pixel value), the minimum pixel value, the median pixel value, or the average picture level (APL) of each block area. In this case, the pixel value may include at least one of a luminance value (or a grayscale value) or a color coordinate value.

The processor 140 may predict the brightness information of the virtual image based on the brightness information of the input image and the transmittance information of the mirror panel 130 as illustrated in FIG. 12.

The processor 140 may adjust the brightness of the multiview image based on the predicted brightness information of the virtual image in operation S1420, and display the multiview image on the 3D display 110 in operation S1425.

According to an embodiment, the processor 140 may adjust the brightness of the multiview image such that the brightness of the multiview image recognized by the user's eye becomes the target brightness based on the predicted brightness information of the virtual image, and display the multiview image on the 3D display 110.

Figure 15:
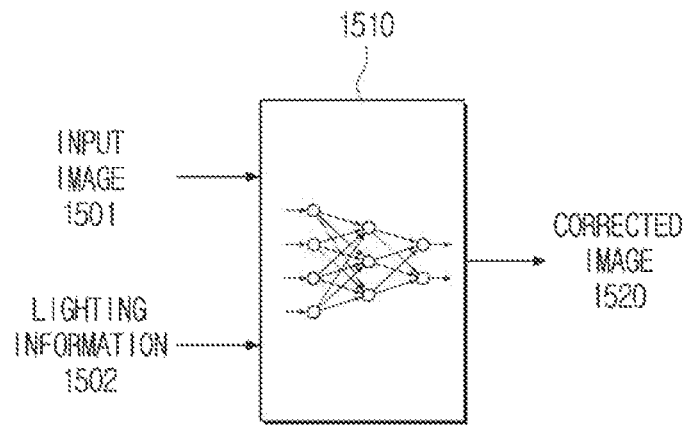
FIG. 15 is a diagram illustrating a method of acquiring a corrected image according to an embodiment.

FIG. 15 is a diagram illustrating a method of acquiring a corrected image according to an embodiment.

According to an embodiment, the processor 140 may acquire an image which corrected an input image based on lighting information acquired through a sensor. For example, the corrected image may be an image of which colors, luminance etc. were corrected to suit the lighting information.

According to FIG. 15, the processor 140 may input the input image 1501 and the lighting information 1502 into a trained AI model 1510, and acquire a corrected image 1520. The corrected image 1520 may be an image used for generating an image to be displayed on the 3D display 110, or an image to be displayed on the enhance display 120.

Embodiments may input other environment information (weather information, time information, etc.) other than the lighting information or user profile information (user eyesight information, age information, etc.) into the AI model together with the input image, and acquire a corrected image.

According to an embodiment, the AI model may be implemented as a convolutional neural network (CNN), a recurrent neural network (RNN), a restricted Boltzmann machine (RBM), a deep belief network (DBN), a bidirectional recurrent deep neural network (BRDNN), or deep Q-networks, etc., but is not limited thereto.

According to an embodiment, the AI model may be trained based on a pair of input training data and output training data, or trained based on input training data. The feature that the AI model is trained may refer to a basic AI model (e.g., an AI model including any random parameters) being trained using a plurality of training data by a learning algorithm, and predefined operation rules or an AI model set to perform desired characteristics (or, purposes) are thereby made. Such learning may be performed through the display apparatus 100, but the disclosure is not limited thereto, and it may be performed through a separate server and/or system. As examples of learning algorithms, there are supervised learning, unsupervised learning, semi-supervised learning, or reinforcement learning, but learning algorithms in the disclosure are not limited to the aforementioned examples.

Figure 16:
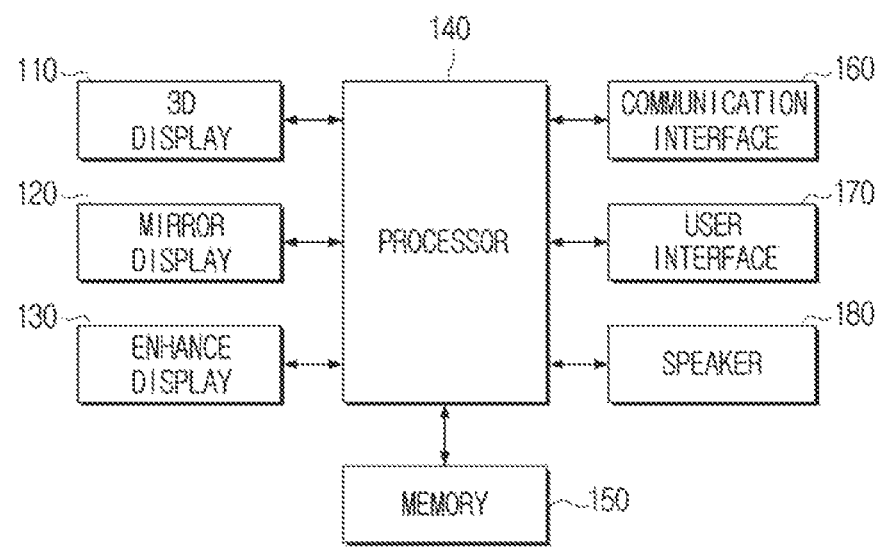
FIG. 16 is a diagram illustrating a detailed configuration of a display apparatus according to an embodiment.

FIG. 16 is a diagram illustrating a detailed configuration of a display apparatus according to an embodiment.

According to FIG. 16, the display apparatus 100 may include a 3D display 110, an enhance display 120, a mirror panel 130, a processor 140, a memory 150, a communication interface 160, a user interface 170, and a speaker 180. Among the components illustrated in FIG. 16, regarding the components overlapping with the components illustrated in FIG. 2, detailed explanation will be omitted.

The memory 150 may store data for the various embodiments of the disclosure. The memory 150 may be implemented in a form of a memory embedded in the display apparatus 100, or in a form of a memory that may communicate with (or may be attached to or detached from) the display apparatus 100, according to the usage of stored data. For example, in the case of data for operating the display apparatus 100, the data may be stored in a memory embedded in the display apparatus 100, and in the case of data for an extended function of the display apparatus 100, the data may be stored in a memory that may communicate with the display apparatus 100. In the case of a memory embedded in the display apparatus 100, the memory may be implemented as at least one of a volatile memory (e.g., a dynamic random access memory (RAM) (DRAM), a static RAM (SRAM), or a synchronous dynamic RAM (SDRAM), etc.) or a non-volatile memory (e.g., an one time programmable read-only memory (ROM) (OTPROM), a programmable ROM (PROM), an erasable and programmable ROM (EPROM), an electrically erasable and programmable ROM (EEPROM), a mask ROM, a flash ROM, a flash memory (e.g., NAND flash, NOR flash, etc.), a hard drive, or a solid state drive (SSD)). Also, in the case of a memory that may communicate with the display apparatus 100, the memory may be implemented in forms such as a memory card (e.g., compact flash (CF), secure digital (SD), micro secure digital (Micro-SD), mini secure digital (Mini-SD), extreme digital (xD), a multi-media card (MMC), etc.), an external memory that may be connected to a USB port (e.g., a USB memory), etc.

According to an embodiment, the memory 150 may store at least one instruction or a computer program including instructions for controlling the display apparatus 100.

According to another embodiment, the memory 150 may store information on an AI model including a plurality of layers. The feature of storing information on an AI model may refer to storing various kinds of information related to the operations of the AI model (e.g., information on the plurality of layers included in the AI model, information on parameters (e.g., filter coefficients, biases, etc.) used in each of the plurality of layers, etc.).

According to an embodiment, the memory 150 may be implemented as a single memory storing data generated in various operations according to embodiments. According to an embodiment, the memory 150 may also be implemented to include a plurality of memories that respectively store different types of data, or respectively store data generated in different steps.

The communication interface 160 may be a component performing communication with an external apparatus. For example, the communication interface 160 may receive an input of an image signal by a streaming or downloading method from an external apparatus (e.g., a source apparatus), an external storage medium (e.g., a USB memory), an external server (e.g., a webhard), etc. through communication methods such as Wi-Fi based on access points (Aps) (a wireless local area network (LAN)), Bluetooth, Zigbee, a wired/wireless LAN, a wide area network (WAN), Ethernet, IEEE 1394, a high-definition multimedia interface (HDMI), a USB, a mobile high-definition link (MHL), Audio Engineering Society/European Broadcasting Union (AES/EBU), optical, coaxial, etc. The image signal may be a digital image signal of any one of an SD image, an HD image, a full HD image, or an ultra HD image, but is not limited thereto.

The user interface 170 may be implemented as an apparatus such as a button, a touch pad, a mouse, and a keyboard, or implemented as a touch screen that may perform the aforementioned display function and a manipulation input function together, a remote control transceiver, etc. The remote control transceiver may receive a remote control signal or transmit a remote control signal from and to an external remote control apparatus through at least one communication method among infrared communication, Bluetooth communication, or Wi-Fi communication. Depending on embodiments, the remote control transceiver may receive a wheel input signal transmitted from an external remote control.

The speaker 180 outputs an acoustic signal. For example, the speaker 180 may convert a digital acoustic signal processed at the processor 140 into an analogue acoustic signal and amplify the signal, and output the signal. For example, the speaker 180 may include at least one speaker unit, a digital/analog (D/A) converter, an audio amplifier, etc. which may output at least one channel. According to an embodiment, the speaker 180 may be implemented to output various multi-channel acoustic signals. In this case, the processor 140 may perform enhance processing on an acoustic signal input to correspond to enhance processing of an input image, and control the speaker 180 to output the signal. For example, the processor 140 may convert an input two-channel acoustic signal into a virtual multi-channel (e.g., a 5.1 channel) acoustic signal, or recognize the location where the display apparatus 100 is placed and process the signal as a stereoscopic acoustic signal optimized for the space, or provide an acoustic signal optimized according to the type (e.g., the genre of the content) of an input image.

Other than the above, the display apparatus 100 may additionally include at least one of a tuner, a demodulation part, and a camera depending on implementation examples. The tuner may tune a channel selected by a user in a radio frequency (RF) broadcast signal received through an antenna, or all pre-stored channels, and receive an RF broadcast signal. The demodulation part may receive a converted digital IF (DIF) signal from the tuner and demodulate the signal, and perform channel demodulation, etc. The camera may be turned on according to a predetermined event, and perform photographing. The camera may convert the photographed image into an electronic signal, and generate image data based on the converted signal.

According to the aforementioned various embodiments, the resolution of a 3D image which was reduced due to multi-viewpoints may be improved using a virtual image. In particular, reduction of the luminance and a moire, etc. that may be generated in a structure where a transparent display is arranged on the front side of the 3D display 110 may be prevented. For example, in the case of a structure where a transparent display is arranged on the front side of the 3D display 110, there may be a restriction on the resolution that may be improved due to a tradeoff relation between the transmittance and the resolution. According to embodiments, a virtual image may be provided in a desired resolution regardless of the transmittance of the mirror panel.

Also, if a moire is generated due to overlapping of regular patterns of the 3D display 110 and the transparent display, and a dispersion function is inserted between the two displays for overcoming this, the stereoscopic characteristic may be degraded, and it may become a factor for reduction of the luminance. Accordingly, as a diffusion sheet, etc. used for removing a moire are not used, the stereoscopic characteristic may be implemented more clearly.

In addition, conversion between the 2D/3D modes may be achieved. In related art 3D display apparatuses by the auto-stereoscopic method, conversion between the 2D/3D modes is not possible, or the components or technologies for conversion are very complex. However, according to embodiments, the 3D mode may be implemented with a combination of a 3D display and a virtual image, and the 2D mode may be implemented only with a virtual image while turning off the 3D display, and thus conversion from the 3D mode to the 2D mode may be easily achieved.

The methods according to the aforementioned various embodiments of the disclosure may be implemented in forms of applications that may be installed on conventional electronic apparatuses. Alternatively, at least some of the methods according to the aforementioned various embodiments of the disclosure may be performed using a deep learning-based AI model, i.e., a learning network model.

Also, the methods according to the aforementioned various embodiments of the disclosure may be implemented just with software upgrade, or hardware upgrade of conventional electronic apparatuses.

In addition, the aforementioned various embodiments of the disclosure may be implemented through an embedded server provided on an electronic apparatus, or an external server of an electronic apparatus.

According to an embodiment of the disclosure, the aforementioned various embodiments may be implemented as software including instructions stored in machine-readable storage media, which may be read by machines (e.g., computers). The machines refer to apparatuses that call instructions stored in a storage medium, and may operate according to the called instructions, and the apparatuses may include an electronic apparatus according to the aforementioned embodiments. In case an instruction is executed by a processor, the processor may perform a function corresponding to the instruction by itself, or using other components under its control. An instruction may include a code that is generated or executed by a compiler or an interpreter. A storage medium that is readable by machines may be provided in the form of a non-transitory storage medium.

Also, according to an embodiment of the disclosure, the methods according to the aforementioned various embodiments may be provided while being included in a computer program product. A computer program product refers to a product, and it may be traded between a seller and a buyer. A computer program product may be distributed in the form of a storage medium that is readable by machines (e.g., a compact disc read only memory (compact disc (CD) ROM (CD-ROM))), or distributed on-line through an application store (e.g., Play Store™). In the case of on-line distribution, at least a portion of a computer program product may be stored in a storage medium such as the server of the manufacturer, the server of the application store, and the memory of the relay server at least temporarily, or may be generated temporarily.

In addition, each of the components (e.g., a module or a program) according to the aforementioned various embodiments may be comprised of a single entity or a plurality of entities, and some sub-components among the aforementioned sub-components may be omitted, or different sub-components may be further included in the various embodiments. Alternatively or additionally, some components (e.g., modules or programs) may be integrated into one entity to perform the same or similar functions performed by each component prior to integration. Operations performed by a module, a program, or other components, in accordance with the various embodiments, may be performed sequentially, in parallel, repetitively, or in a heuristic manner, or at least some operations may be performed in a different order, omitted, or other operations may be added.

While certain embodiments of the disclosure have been shown and described, the disclosure is not limited to the aforementioned embodiments, and it is apparent that various modifications may be made by those having ordinary skill in the art to which the disclosure belongs, without departing from the gist of the disclosure as claimed by the appended claims. Further, it is intended that such modifications are not to be interpreted independently from the technical idea or prospect of the disclosure.

What is claimed is:
1. A display apparatus comprising:
   a three dimensional (3D) display comprising:
      a display panel, and
      a visual field separator provided on a front surface of the display panel;
   an enhance display disposed at a first angle with respect to the 3D display;
   a mirror panel disposed at a second angle with respect to the 3D display and between the 3D display and the enhance display; and
   at least one processor configured to operate in a 3D image provision mode and operate a two dimensional (2D) image provision mode,
   wherein the at least one processor is further configured to, in the 3D image provision mode:
      display an input image on the enhance display,
      provide a virtual image at a position in front of the front surface of the 3D display,
      display a multiview image corresponding to the input image on the 3D display,
      identify a plurality of first pixels having different viewpoints in the multiview image,
      identify a plurality of second pixels corresponding to the plurality of first pixels in the virtual image, acquire a first processed image by processing the input image such that at least one of pixel values or brightness values of the plurality of second pixels have different values, and display the first processed image on the enhance display.

2. The display apparatus of claim 1, wherein the 3D display is arranged vertically with respect to the enhance display, and wherein the mirror panel comprises a half mirror panel tilted 45 degrees with respect to the enhance display.

3. The display apparatus of claim 1, wherein the position at which the virtual image is provided is adjusted based on at least one of a location of the 3D display and a location of the enhance display.

4. The display apparatus of claim 1, wherein the at least one processor is further configured to, in the 3D image provision mode:

render a plurality of image views having different viewpoints based on a depth of the input image, and display the multiview image by arranging the plurality of image views in a predetermined arrangement pattern on the display panel of the 3D display.

5. The display apparatus of claim 4, wherein the at least one processor is further configured to, in the 3D image provision mode:

predict a cross-talk (X-talk) generated among image views of different viewpoints based on arrangement locations of the plurality of image views, acquire a second processed image that compensates the X-talk by processing the input image based on the predicted X-talk, and display the second processed image on the enhance display.

6. The display apparatus of claim 1, wherein the at least one processor is further configured to:

predict user recognized image quality information for the virtual image based on transmittance information of the mirror panel, acquire a third processed image by processing an image quality of the input image based on the user recognized image quality information and target image quality information, and display the third processed image on the enhance display.

7. The display apparatus of claim 1, wherein the at least one processor is further configured to:

acquire a fourth processed image by performing reinforcement processing of at least one of a boundary area, an edge area, and a point area included in the input image in the 3D image provision mode, and display the fourth processed image on the enhance display.

8. The display apparatus of claim 1, wherein the at least one processor is further configured to:

predict brightness information of the virtual image based on brightness information of the input image and transmittance information of the mirror panel, and adjust a brightness of the multiview image based on the predicted brightness information of the virtual image.

9. The display apparatus of claim 1, wherein a resolution of the image displayed on the enhance display is equal to or lower than a resolution of the display panel of the 3D display.

10. A control method of a display apparatus comprising a three dimensional (3D) display comprising a display panel and a visual field separator provided on a front surface of the display panel, an enhance display disposed at a first angle with respect to the 3D display, and a mirror panel disposed at a second angle with respect to the 3D display and between the 3D display and the enhance display, the control method comprising:

in a 3D image provision mode:

displaying an input image on the enhance display;

providing a virtual image at a position in front of the front surface of the 3D display;

displaying a multiview image corresponding to the input image on the 3D display;

identifying a plurality of first pixels having different viewpoints in the multiview image;

identifying a plurality of second pixels corresponding to the plurality of first pixels in the virtual image;

acquiring a first processed image by processing the input image such that at least one of pixel values or brightness values of the plurality of second pixels have different values; and displaying the first processed image on the enhance display.

11. The control method of claim 10, wherein the 3D display is arranged vertically with respect to the enhance display, and wherein the mirror panel comprises a half mirror panel tilted 45 degrees with respect to the enhance display.

12. The control method of claim 10, wherein the position at which the virtual image is provided is adjusted based on at least one of a location of the 3D display and a location of the enhance display.

13. The control method of claim 10, wherein, in the 3D image provision mode, the displaying the multiview image comprises:

rendering a plurality of image views having different viewpoints based on a depth of the input image; and displaying the multiview image by arranging the plurality of image views in a predetermined arrangement pattern on the display panel of the 3D display.

14. The control method of claim 13, further comprising, in the 3D image provision mode:

predicting a cross-talk (X-talk) generated among image views of different viewpoints based on arrangement locations of the plurality of image views;

acquiring a second processed image that compensates the X-talk by processing the input image based on the predicted X-talk; and displaying the second processed image on the enhance display.

15. The control method of claim 10, further comprising:

predicting user recognized image quality information for the virtual image based on transmittance information of the mirror panel;

acquiring a third processed image by processing an image quality of the input image based on the user recognized image quality information and target image quality information; and displaying the third processed image on the enhance display.

16. The control method of claim 10, further comprising:

acquiring a fourth processed image by performing reinforcement processing of at least one of a boundary area, an edge area, and a point area included in the input image; and displaying the fourth processed image on the enhance display.

17. The control method of claim 10, further comprising:
predicting brightness information of the virtual image based on brightness information of the input image and transmittance information of the mirror panel; and
adjusting a brightness of the multiview image based on the predicted brightness information of the virtual image.

18. A non-transitory computer-readable storage medium storing instructions that, when executed by at least one processor, causes the at least one processor to:
in a three dimensional (3D) image provision mode:
display an input image on an enhance display provided at a first angle with respect to a 3D display;
provide a virtual image at a position in front of a front surface of the 3D display;
display a multiview image corresponding to the input image on the 3D display;
identify a plurality of first pixels having different viewpoints in the multiview image;
identify a plurality of second pixels corresponding to the plurality of first pixels in the virtual image;
acquire a first processed image by processing the input image such that at least one of pixel values or brightness values of the plurality of second pixels have different values; and
display the first processed image on the enhance display.

\* \* \* \* \*